Patented Oct. 3, 1950

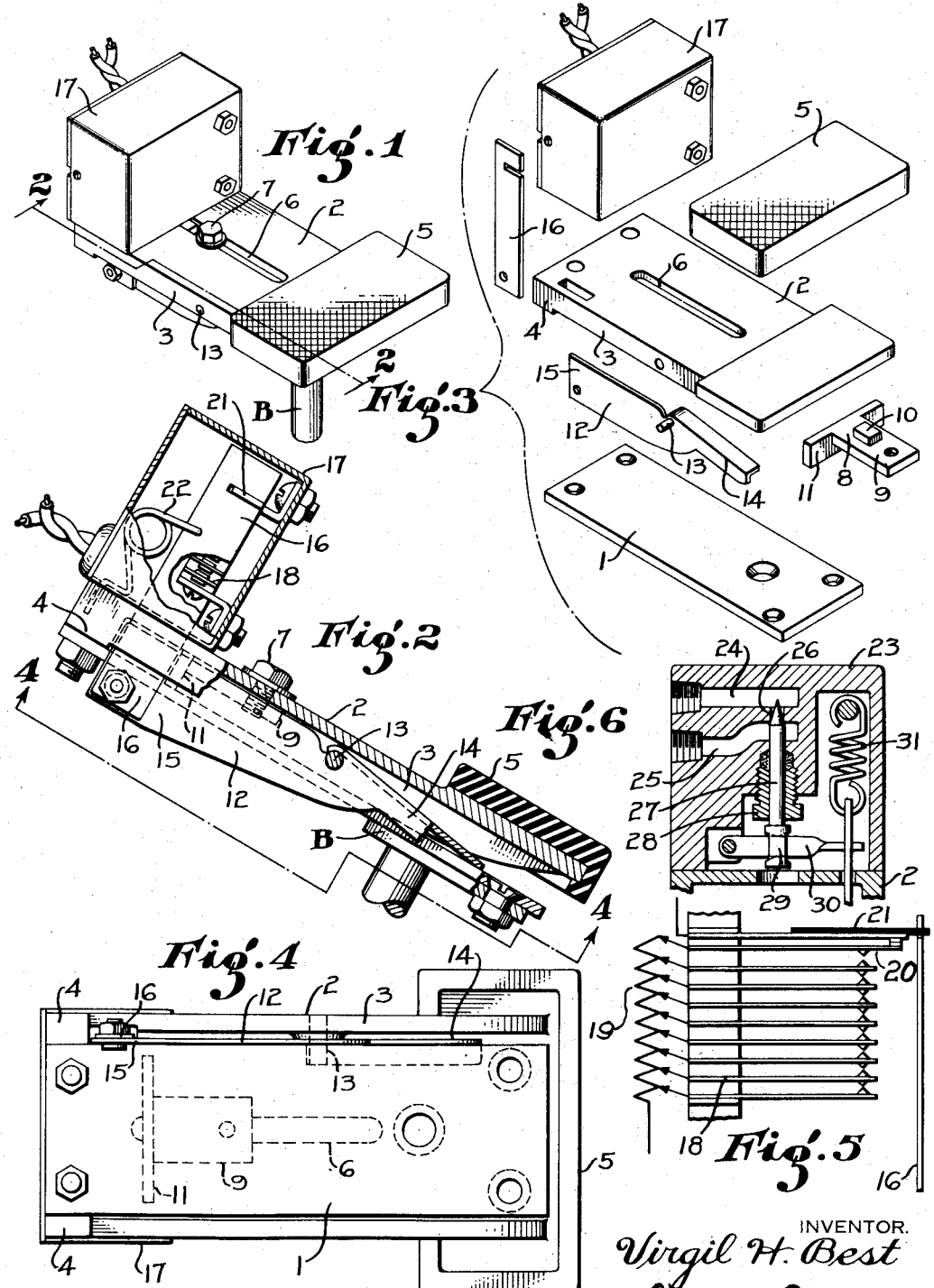

2,524,026

UNITED STATES PATENT OFFICE 2,524,026

TRAILER BRAKE CONTROL

Virgil H. Best, Pasadena, Calif.

Application June 11, 1949, Serial No. 98,515

14 Claims. (Cl. 201—48)

My invention relates to brake controls for trailers and included in the objects of my invention are:

First, to provide a brake control for trailers which is mounted on the brake pedal of the traction unit or vehicle which pulls the trailer.

Second, to provide a brake control for trailers which involves a simple and readily accessible means, whereby the brakes of the trailer may be caused to operate in the desired ratio to the brakes of the traction unit.

Third, to provide a brake control for trailers which in no manner interferes with the brake pedal or brake system of the traction unit, and which may remain in place whether or not a trailer is attached.

Fourth, to provide a brake control for trailers which is particularly adapted to the operation of electrically energized trailer brakes and which may be arranged to operate air brakes or vacuum brakes if desired.

With the above and other objects in view as may appear hereinafter, reference is made to the accompanying drawings, in which:

Figure 1 is a perspective view of my brake control, indicated as mounted on a vehicle brake pedal.

Figure 2 is a partial side view partial sectional view taken substantially along the line 2—2 of Figure 1.

Figure 3 is an exploded view showing the various parts of my device.

Figure 4 is a bottom view of my device taken through 4—4 of Figure 2, with the brake pedal omitted.

Figure 5 is a diagrammatical view illustrating the electrical components of my device.

Figure 6 is a sectional view of a modified form of my device adapted for operation of air brakes or vacuum brakes.

My device includes a leaf spring 1 which is relatively stiff, adapted to be fastened by one end to a vehicle brake pedal B in place of the usual brake pedal pad. The leaf spring extends upwardly or forwardly from the brake pedal and is covered by a pedal base 2 in the form of a plate, having side flanges 3 and a boss 4 at its upward or forward end. A leaf spring 1 is secured to the boss 4. With this arrangement, the extended or lowered forward end of the pedal base overlies but is spaced from the brake pedal B. This end of the base 2 is provided with a pad 5. Pressure exerted on the pad 5 flexes the leaf spring 1.

The pedal base 2 is provided with a longitudinal slot 6 which receives a screw 7 for adjustedly securing a fulcrum member 8. The fulcrum member comprises a tongue 9 which underlies the slot 6 and which is provided with a lug 10 which projects upwardly into the slot 6. One end of the tongue 9 is provided with a cross bar 11, disposed edgewise and arranged to engage the leaf spring 1. Adjustment of the fulcrum member 8 varies the effective length of the leaf spring 1 so as to increase or decrease its resistance to pressure exerted on the pad 5.

Mounted at one side of the leaf spring 1 is a lever 12, which is pivotally supported intermediate its ends by a pin 13 projecting into one of the side flanges 3. One arm 14 of the lever extends rearwardly and downwardly, and is provided with a lateral portion for engagement with the leaf spring at its end secured to the brake pedal B. The other arm 15 of the lever 12, extends upwardly and forwardly to a point near the attached end of the pedal base 2. At this end the arm 15 is attached to a link bar 16 which projects upwardly through a slot in the base and into a control switch housing 17. The control switch housing is in the form of a rectangular sheet metal shell and contains a switch bank 18 comprising a series or stack of leaf spring switches connected at spaced points to a resistor 19. The uppermost switch element 20 of the switch bank is provided with an insulated extension 21 which is attached to the upper end of the link bar 16. A spring 22 is mounted within the control switch housing and attached to the link bar 16, so as to urge it toward an upward position, so that normally the switches comprising the bank are open. Downward movement of the link bar 16 first closes a circuit through the entire resister 19 and then as succeeding switch elements are closed, shorts out predetermined sections of the resistor so as to decrease its effective resistance. The resister is connected to a suitable electrically operated brake system not shown.

A hydraulic system may be provided in place of the electrical system. In this case a valve body 23 is substituted for the control switch housing. The valve body includes flow passages 24 and 25 connected by a port 26 controlled by a needle valve 27. The needle valve protrudes through a packing gland 28 and is provided with a slotted head 29 having knife edge fulcrums which engage a transversely disposed operating lever 30 pivoted at one end to the valve body and connected at its other end to the link bar 16. A coil spring 31 urges the link bar upwardly in a direction to effect closure of the needle valve 27.

The flow passages 24 and 25 may be incorporated in an otherwise conventional air brake system whether employing compressed air of vacuum pressures.

Operation of my brake control for trailers is as follows:

The device is secured to the brake pedal of the traction unit or other vehicle to which a trailer is to be connected. Operation of the brake pedal is not altered except that pressure on the pad 5 flexes the spring 1 so as to cause movement of the pad toward the brake pedal in proportion to the braking pressure applied. This relative movement between the pad or its pedal base 2 and the leaf spring results in rocking movement of the lever 12 with corresponding movement of the link bar 16. When braking pressure is removed, the link bar is in its upper position wherein the electrical circuit shown in Figure 5 is open or the needle valve shown in Figure 6 is closed. As braking pressure is applied, the brake pedal B moves downwardly and the corresponding flexure of the spring leaf 1 causes a proportionate movement of the lever 12, decreasing the effective resistance of the resistor 19 or opening the valve 27 a proportionate amount.

It is essential that the braking effect on the trailer be in proportion to the braking effect on the traction unit. This is accomplished by the adjustable fulcrum member 8 which is readily accessible. If the braking action of the trailer brakes is excessive, the fulcrum member is adjusted rearwardly and downwardly, to decrease the effective length of the leaf spring 1, whereas, if a greater braking action of the trailer brakes is desired, the fulcrum member is adjusted upwardly and forwardly to increase the effective length of the leaf spring 1.

It will be observed that there is no interference with the ordinary operation of the brake pedal except for a slightly greater foot travel in operating the brake. Thus the trailer control unit may be mounted permanently in place.

It should of course be noted, that flexible leads whether electrical or hydraulic extend from the control switch housing 17 or valve body 23, so that the necessary movement of the brake pedal may be obtained without interference.

Having fully described my invention, it is to be understood that I do not wish to be limited to the details herein set forth, but my invention is of the full scope of the appended claims.

I claim:

1. A device for the control of brakes auxiliary to brakes directly controlled by a brake pedal, involving: cantilever related and relatively yieldable members, one of said members being rigidly attachable to the brake pedal, the other adapted to occupy a portion above, spaced from and covering said brake pedal for foot engagement in lieu of said brake pedal to depress toward said brake pedal in proportion to movement of said brake pedal as said brake pedal is operated; and means operated by movement of said member relative to said brake pedal for controlling brakes auxiliary to the brakes controlled by said brake pedal, whereby said direct and auxiliary brakes are operated simultaneously.

2. A device as set forth in claim 1, wherein said means involves a variable resistance and an element connected with said member to vary said resistance in proportion to pressure applied through said members to said brake pedal.

3. A device as set forth in claim 1, wherein said means involves a valve and an element connected with said member to vary the opening of said valve in proportion to pressure applied through said members to said brake pedal.

4. A device for the control of brakes auxiliary to brakes directly controlled by a brake pedal, involving: a first member adapted for attachment to a brake pedal, a second member attached to said first member and disposed above and spaced from said brake pedal for foot engagement in lieu of said brake pedal; said members being relatively yieldable and adapted to transmit to said brake pedal pressure applied to said second or overlying member, whereby relative movement of said members is in proportion to movement of said brake pedal; means for varying the resistance of said members to relative movement thereby to vary the proportion of their movement relative to movement of said brake pedal; and means operated by relative movement of said members to effect control of brakes auxiliary to the brakes controlled by said brake pedal.

5. A device for the control of brakes auxiliary to brakes directly controlled by a brake pedal, involving: a relatively stiff leaf spring adapted to be attached to a vehicle brake pedal and extend laterally therefrom; a pedal base secured to the extended end of said leaf spring to occupy a position above and covering said brake pedal in spaced relation thereto for engagement by an operator's foot, said pedal base movable by flexure of said spring to and from said brake pedal under foot pressure in proportion to movement of said brake pedal; auxiliary brake control means; and connecting means responsive to relative movement of said pedal base and leaf spring to actuate said auxiliary brake control means.

6. A device for the control of brakes auxiliary to brakes directly controlled by a brake pedal, involving: a relatively stiff leaf spring adapted to be attached to a vehicle brake pedal and extend laterally therefrom; a pedal base secured to the extended end of said leaf spring and projecting cantileverwise over said brake pedal in spaced relation thereto for engagement by an operator's foot, said pedal base movable to and from said brake pedal under foot pressure, causing flexure of said spring; a rheostat unit carried by said pedal base; and connecting means responsive to relative movement of said pedal base and leaf spring to actuate said rheostat unit.

7. A device for the control of brakes auxiliary to brakes directly controlled by a brake pedal, involving: a relatively stiff leaf spring adapted to be attached to a vehicle brake pedal and extend laterally therefrom; a pedal base secured to the extended end of said leaf spring to overlay said brake pedal in spaced relation thereto for engagement by an operator's foot, said pedal base movable to and from said brake pedal under foot pressure, causing flexure of said spring; a valve means carried by said pedal base; and connecting means responsive to relative movement of said pedal base and leaf spring to actuate said valve means.

8. A device for the control of brakes auxiliary to brakes directly controlled by a brake pedal, involving: a relatively stiff leaf spring adapted to be attached to a vehicle brake pedal and extend laterally therefrom; a pedal base secured to the extended end of said leaf spring and projecting cantileverwise over said brake pedal in spaced relation thereto for engagement by an operator's foot, said pedal base movable to and from said brake pedal under foot pressure, causing flexure of said spring; a fulcrum element interposed between said pedal base and leaf spring and adjustable longitudinally of said leaf spring to alter the foot pressure required to effect a given relative movement of said pedal base and leaf spring, said fulcrum element being accessible from the foot engaging side of said pedal base; auxiliary brake control means; and connecting means responsive to relative movement of said pedal base and leaf spring to actuate said auxiliary brake control means.

9. A device for the control of brakes auxiliary to brakes directly controlled by a brake pedal, involving: a relatively stiff leaf spring adapted to be attached to a vehicle brake pedal and extend laterally therefrom; a pedal base secured to the extended end of said leaf spring and projecting cantileverwise over said brake pedal in spaced relation thereto for engagement by an operator's foot, said pedal base movable to and from said brake pedal under foot pressure, causing flexure of said spring; a fulcrum element interposed between said pedal base and leaf spring and adjustable longitudinally of said leaf spring to alter the foot pressure required to effect a given relative movement of said pedal base and leaf spring, said fulcrum element being accessible from the foot engaging side of said pedal base; a rheostat unit carried by said pedal base; and connecting means responsive to relative movement of said pedal base and leaf spring to actuate said rheostat unit.

10. A device for the control of brakes auxiliary to brakes directly controlled by a brake pedal, involving: a relatively stiff leaf spring adapted to be attached to a vehicle brake pedal and extend laterally therefrom; a pedal base secured to the extended end of said leaf spring to overlay said brake pedal in spaced relation thereto for engagement by an operator's foot, said pedal base movable to and from said brake pedal under foot pressure, causing flexure of said spring; a fulcrum element interposed between said pedal base and leaf spring and adjustable longitudinally of said leaf spring to alter the foot pressure required to effect a given relative movement of said pedal base and leaf spring, said fulcrum element being accessible from the foot engaging side of said pedal base; a valve means carried by said pedal base; and connecting means responsive to relative movement of said pedal base and leaf spring to actuate said valve means.

11. A device for attachment to a vehicle brake pedal for control of auxiliary apparatus in proportion to movement of said brake pedal, involving: an auxiliary tread member; means supporting said tread member over a brake pedal in spaced relation thereto, said supporting means being yieldable under load applied to said tread member to transmit pressure to said brake pedal and cause said tread member to move relative to said brake pedal in proportion to movement of said brake pedal; means for altering the effective yieldability of said supporting means to vary the proportional movements of said tread member and brake pedal; and a control means for auxiliary apparatus operated by relative movement of said tread member and brake pedal.

12. A device for attachment to a vehicle brake pedal for control of auxiliary apparatus in proportion to movement of said brake pedal, involving: an auxiliary tread member; means supporting said tread member over a brake pedal in spaced relation thereto, said supporting means being yieldable under load applied to said tread member to transmit pressure to said brake pedal and cause said tread member to move relative to said brake pedal in proportion to movement of said brake pedal; control means responsive to relative movement of said tread member and brake pedal for operating an auxiliary apparatus in proportion to movement of said brake pedal; and means accessible from the upper side of said tread member to alter the effective yieldability of said support means thereby to vary the proportional movements of said brake pedal and tread member thereby to change the operation of said auxiliary apparatus with respect to said brake pedal.

13. A device for attachment to a vehicle brake pedal for control of auxiliary apparatus in proportion to movement of said brake pedal, involving: relatively yieldable cantilever members having adjacent free ends, one about the other, movable to and from each other the under one of said members being attachable to a brake pedal to dispose the upper one of the members over and spaced from said brake pedal, the free end of said other member forming a tread means engageable by one's foot in lieu of the brake pedal to move relative to said brake pedal in proportion to the depression of said brake pedal; a variable fulcrum element between said members to alter their relative yieldability thereby to vary the proportional movement of said tread means and brake pedal; and a control means for auxiliary apparatus operated by relative movement of said tread means and brake pedal.

14. A device for attachment to a vehicle brake pedal for control of auxiliary apparatus in proportion to movement of said brake pedal, involving: relatively yieldable cantilever members having adjacent free ends, one above the other, movable to and from each other the under one of said members being attachable to a brake pedal to dispose the upper one of the members over and spaced from said brake pedal, the free end of said other member forming a tread means engageable by one's foot in lieu of the brake pedal to move relative to said brake pedal in proportion to the depression of said brake pedal; a variable fulcrum interposed between said cantilever members and accessible from above the upper side of said upper member for movement to alter the relative yieldability of said members thereby to vary the proportional movement of said tread means and brake pedal; and a control means for auxiliary apparatus operated by relative movement of said cantilever members, coincidental with movement of said tread means and brake pedal.

VIRGIL H. BEST.

REFERENCES CITED

The following references are of record in the file of this patent:

UNITED STATES PATENTS

| Number | Name | Date |
| --- | --- | --- |
| 1,952,679 | Leveen | Mar. 27, 1934 |
| 2,192,714 | Norman et al. | Mar. 5, 1940 |
| 2,260,641 | Reid | Oct. 28, 1941 |